Oct. 22, 1946.   L. B. RUSSELL, JR   2,409,901
SEPARABLE RIM
Filed March 24, 1944   2 Sheets-Sheet 1
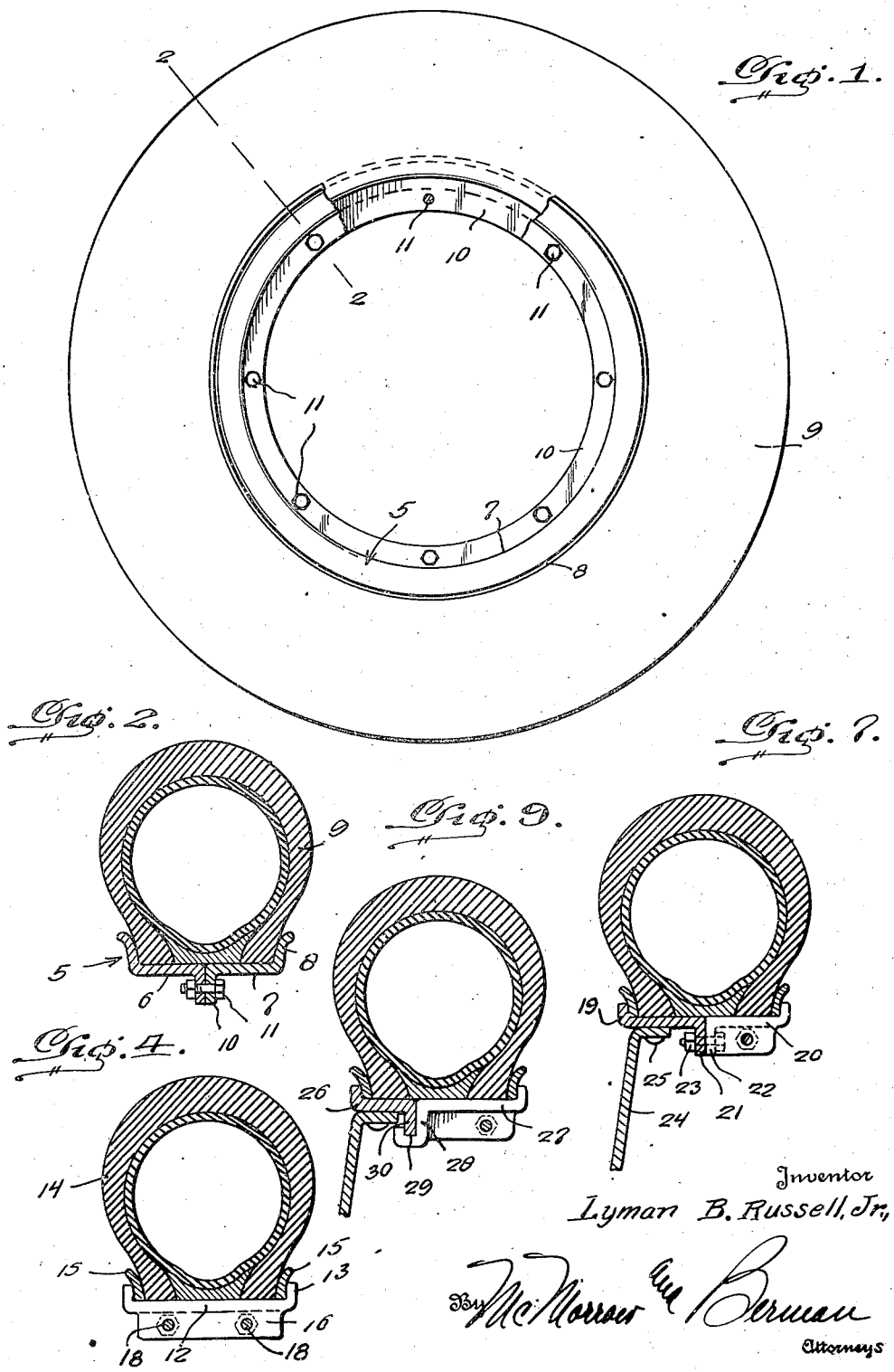

Oct. 22, 1946.  L. B. RUSSELL, JR  2,409,901
SEPARABLE RIM
Filed March 24, 1944  2 Sheets-Sheet 2
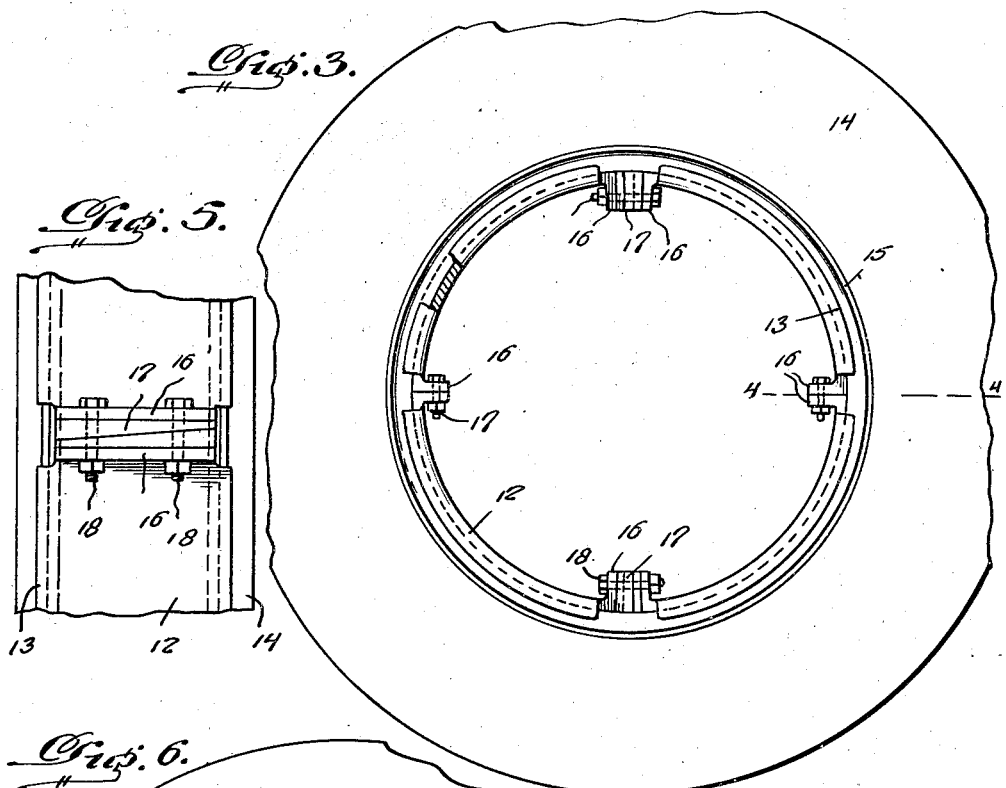
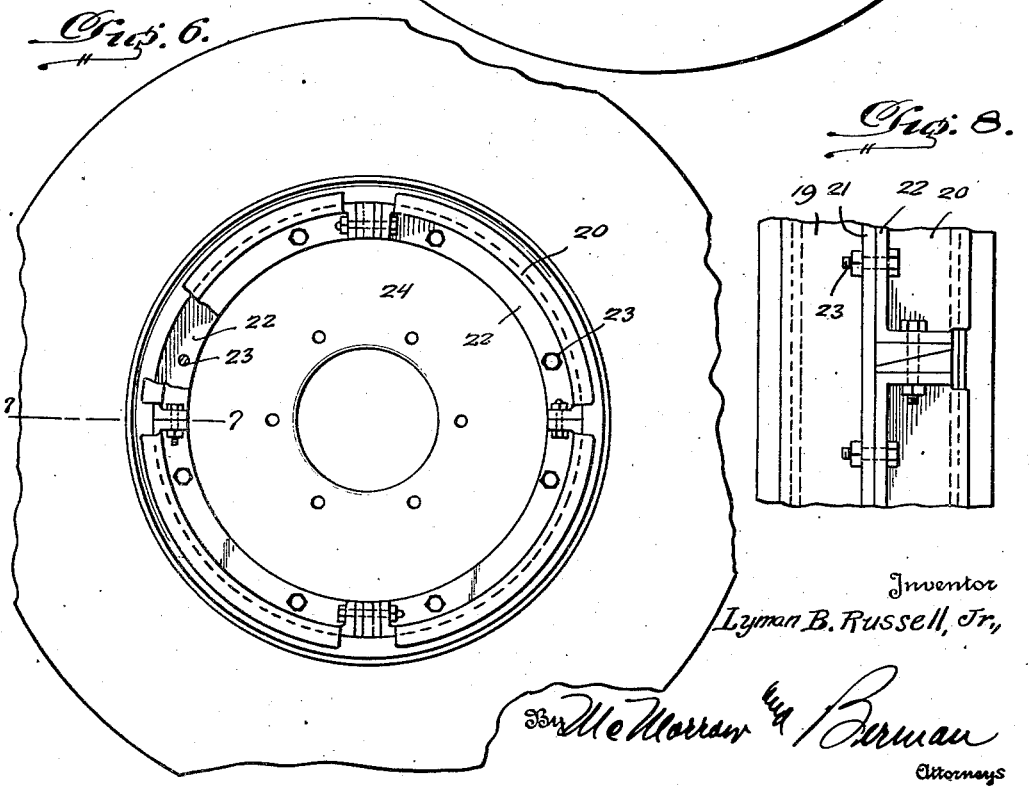
Inventor
Lyman B. Russell, Jr.,
By McMorrow and Berman
Attorneys Patented Oct. 22, 1946

2,409,901

UNITED STATES PATENT OFFICE 2,409,901

SEPARABLE RIM

Lyman B. Russell, Jr., Edinburg, Tex.

Application March 24, 1944, Serial No. 527,943

2 Claims. (Cl. 152—405)

The present invention relates to a new and useful improvement in separable rims for wheels intended chiefly for use with automobile and similar vehicles, although the invention is widely applicable to all kinds of wheels with which a removable rim is employed.

An important object of the present invention is to provide a tire rim of this character upon which a pneumatic tire may be easliy and quickly mounted and removed from the rim without removing the rim from the wheel and which at the same time is simple and practical in construction, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which Figure 1 is a side elevational view of an annularly split type of rim with parts broken away.

Figure 2 is a sectional view taken substantially on a line 2—2 of Figure 1.

Figure 3 is a side elevational view of a modified demountable rim construction, and in which the rim is formed of transversely split segments.

Figure 4 is a transverse sectional view taken substantially on a line 4—4 of Figure 3.

Figure 5 is a fragmentary detail showing the spacing members between certain of the segments.

Figure 6 is a side elevational view of a modified segmental rim construction.

Figure 7 is a transverse sectional view taken substantially on the line 7—7 of Figure 6.

Figure 8 is a fragmentary detail of the spacing blocks for certain of the segments for the form of the invention illustrated in Figure 6.

Figure 9 is a transverse sectional view illustrating an interlocking connection between the annularly split sections of the rim.

Referring now to the drawings in detail and first with reference to the form of the invention illustrated in Figures 1 and 2, the numeral 5 designates the rim generally which is formed of annularly split sections 6 and 7 having the radially outwardly projecting flanges 8 at their outer edges for receiving the tire casing 9.

The abutting edges of the sections 6 and 7 are formed with radially inwardly extending flanges 10 having their faces in abutting engagement and secured together by the bolts and nuts 11.

In the form of the invention illustrated in Figures 3 to 5, inclusive, the rim is formed of a plurality of transversely split segments 12 having the radially outwardly extending flanges 13 at their side edges for receiving the tire casing 14 and between the flanges 13 and the side walls of the tire casing are positioned continuously formed rings 15.

The abutting ends of the segments are formed with radially inwardly extending flanges 16 with the adjacent flanges secured together by the bolts and nuts 18.

Between certain of the flanges 16 of adjacent segments are spaced wedge shaped spacing blocks 17 through which the bolts 18 are also inserted, the bolts 18 being sufficiently long to extend through the wedges as well as through the flanges as will be apparent from inspection of Figures 3 and 5 of the drawings.

In the removal of the rim in this form of the invention it will be apparent that by removing the bolts 18 and the spacers 17 that the segments 12 may then be separated sufficiently to remove the same from the tire.

In the form of the invention illustrated in Figures 6 to 8, inclusive, the rim is formed with an annular section 19 and the transversely split segments 20, the section 19 and the segments 20 having the radially inwardly extending flanges 21 and 22, respectively, secured together by the bolts and nuts 23. The segments 20 are constructed otherwise in the same manner as the form of the invention illustrated in Figures 3 to 5, inclusive.

In this form of the invention, as well as in the other forms of the invention, the disc wheel 24 may be secured to one of the circumferentially split sections by means of bolts, rivets or the like 25 (see Figure 7), or welded thereto, if desired.

In the form of the invention illustrated in Figure 9 the annular section is designated at 26 and the transversely split segments are indicated at 27. The radially inwardly extending flanges 28 of the segments 27 are formed with a channel 29 in which the radially inwardly extending flange 30 of the section 26 is received so as to provide an interlocking connection between the flanges and eliminate the use of bolts and nuts for securing the section and segments together.

From the foregoing it will be apparent that in each form of the invention a sectional demountable rim is provided by means of which one or more of the sections or segments may be easily and quickly removed to facilitate removing of the tire from the rim.

It is believed the details of construction, manner of use and advantages of the invention will be readily understood from the foregoing without further detail explanation.

Having thus described the invention, what I claim is:

1. A separable tire rim comprising a continuous annularly extending rim section, a plurality of transversely split rim segments, said continuous annular section and said transversely split rim segments cooperating to form a complete tire rim, cooperatively opposed annularly extending radially inwardly projecting flanges on the abutting edges of said continuous annular section and transversely split rim segments, means detachably connecting the opposed flanges to each other, cooperatively opposed and abutting transverse radially inwardly projecting flanges on the adjacent edges of said transversely split rim segments, means detachably connecting the respective cooperatively opposed and abutting transverse flanges together, and separate detachable spacing members interposed between at least one pair of said transverse rim segment flanges, said detachable spacing members being releasably held as interposed between said last-named flanges by the same means which connect the flanges detachably together.

2. A separable tire rim assembly in the combination and arrangement of coordinated and cooperative parts as set forth in claim 1 wherein the detachable spacing members interposed between the transverse flanges of said transversely split rim segments are in cooperative pairs, each member of a longitudinally tapered form and the members of each pair being arranged parallel but in reverse relation as to the taper thereof.

LYMAN B. RUSSELL, Jr.